US010142128B2

(12) United States Patent
Guichard et al.

(10) Patent No.: US 10,142,128 B2
(45) Date of Patent: *Nov. 27, 2018

(54) NSH SERVICE PLANE FOR L3VPN FORWARDING

(71) Applicant: Cisco Technology, Inc., San Jose, CA (US)

(72) Inventors: James N. Guichard, New Boston, NH (US); Paul Quinn, Wellesley, MA (US); Javed Asghar, Dublin, CA (US); Reinaldo Penno, San Ramon, CA (US); Yixing Ruan, San Jose, CA (US); Carlos M. Pignataro, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,218

(22) Filed: Oct. 16, 2017

(65) Prior Publication Data
US 2018/0041362 A1 Feb. 8, 2018

Related U.S. Application Data

(63) Continuation of application No. 14/870,722, filed on Sep. 30, 2015, now Pat. No. 9,825,778.
(Continued)

(51) Int. Cl.
*H04L 12/801* (2013.01)
*H04L 12/28* (2006.01)
(Continued)

(52) U.S. Cl.
CPC ...... *H04L 12/4633* (2013.01); *H04L 63/0272* (2013.01)

(58) Field of Classification Search
CPC .................................................. H04L 27/2607
See application file for complete search history.

(56) References Cited

U.S. PATENT DOCUMENTS

| 7,664,877 B1 * | 2/2010 | Sheth .................... H04L 45/507 709/242 |
| 8,259,564 B1 | 9/2012 | Gredler et al. |

(Continued)

OTHER PUBLICATIONS

Blendin, Jeremias; Position Paper: Software-Defined Network Service Chaining, Software Defined Networks (EWSDN), 2014 Third European Workshop on , vol., No., pp. 109,114, Sep. 1-3, 2014.
(Continued)

*Primary Examiner* — Brian Roberts
*Assistant Examiner* — Abu-Sayeed Haque

(57) ABSTRACT

A method for applying network services to data traffic forwarded between virtual private network (VPN) sites includes: receiving a data packet addressed to a target site associated with the VPN, determining services to be applied to the data packet according to a service chain, where the determining is a function of at least one of the VPN, the origin site or the target site, adding an indication of a VPN forwarding context onto the data packet, encapsulating the data packet with Network Service Header encapsulation, where a header for the encapsulated data packet indicates at least the service chain; forwarding the encapsulated data packet in accordance with the service chain, receiving the encapsulated data packet at the end of the service chain, terminating the service chain, removing the encapsulation, and forwarding the data packet to a target destination per the indication of a VPN forwarding context.

20 Claims, 6 Drawing Sheets

Related U.S. Application Data

(60) Provisional application No. 62/160,117, filed on May 12, 2015, provisional application No. 62/174,801, filed on Jun. 12, 2015.

(51) Int. Cl.
  *H04L 12/751* (2013.01)
  *H04L 1/04* (2006.01)
  *H04Q 11/04* (2006.01)
  *H04L 12/46* (2006.01)
  *H04L 29/06* (2006.01)

(56) References Cited

U.S. PATENT DOCUMENTS

| | | | |
|---|---|---|---|
| 9,912,614 B2 | 3/2018 | Koganti | |
| 2007/0147363 A1 | 6/2007 | Oswal et al. | |
| 2008/0084881 A1 | 4/2008 | Dharwadkar et al. | |
| 2013/0013809 A1* | 1/2013 | Vasseur | H04L 45/64 709/239 |
| 2014/0003425 A1* | 1/2014 | Zhao | H04L 12/1836 370/390 |
| 2014/0198794 A1* | 7/2014 | Mehta | H04L 45/74 370/392 |
| 2014/0321315 A1* | 10/2014 | Akhter | H04L 41/142 370/253 |
| 2015/0032871 A1* | 1/2015 | Allan | H04L 47/125 709/223 |
| 2015/0043383 A1* | 2/2015 | Farkas | H04L 45/22 370/254 |
| 2015/0071285 A1 | 3/2015 | Kumar et al. | |
| 2015/0089082 A1 | 3/2015 | Patwardhan | |
| 2015/0131484 A1 | 5/2015 | Aldrin | |
| 2016/0014016 A1 | 1/2016 | Guichard et al. | |
| 2016/0218968 A1* | 7/2016 | D'Souza | H04L 45/28 |
| 2016/0248685 A1 | 8/2016 | Pignataro et al. | |
| 2016/0277291 A1 | 9/2016 | Lakshmikanthan et al. | |
| 2016/0330111 A1 | 11/2016 | Manghirmalani et al. | |
| 2016/0344640 A1* | 11/2016 | Soderlund | H04L 47/2483 |

OTHER PUBLICATIONS

Brown, Gabriel; Service Chaining in Carrier Networks, White Paper, Feb. 2015.

Gary Kinghorn, "Network Services Headers (NSH): Creating a Service Plane for Cloud Networks", Cisco Blog, http://blogs.cisco.com/datacenter/nsh, Nov. 19, 2014, 7 pages.

* cited by examiner and forwarding the data packet to a target destination per the
indication of a VPN forwarding context.

NSH SERVICE PLANE FOR L3VPN FORWARDING

RELATED APPLICATION INFORMATION

The present application is a continuation of U.S. patent application Ser. No. 14/870,722, filed on Sep. 30, 2015, which claims the benefit of priority from U.S. Provisional Patent Application, Ser. No. 62/160,117, filed on May 12, 2015, and U.S. Provisional Patent Application, Ser. No. 62/174,801 filed on Jun. 12, 2015.

FIELD OF THE INVENTION

The present disclosure generally relates to applying services to network traffic as it is forwarded between different sites of a virtual private network (VPN).

BACKGROUND

It is not uncommon to apply a variety of services to network traffic as it is forwarded through a network service provider's network. Examples of such services include, but are not limited to, firewalls, diagnostics, prioritization routines, etc. In the context of a Layer 3 Virtual Private Network (L3VPN), such services are typically applied to traffic as it is forwarded between the VPN's different sites using Virtual Routing and Forwarding (VRF) and/or sometimes Virtual Local Area Network (VLAN) configurations. In order to keep track of the destination VPN to which the network traffic is being forwarded, the traffic is typically forced through a hub and spoke topology with VRFs/VLANs at the hub, thereby maintaining the VPN context after the services have been applied.

DESCRIPTION OF EXAMPLE EMBODIMENTS

Overview

A method for applying network services to data traffic forwarded between virtual private network (VPN) sites includes: receiving a data packet addressed to a target site associated with the VPN, determining services to be applied to the data packet according to a service chain, where the determining is a function of at least one of the VPN, the origin site or the target site, adding an indication of a VPN forwarding context onto the data packet, encapsulating the data packet with Network Service Header encapsulation, where a header for the encapsulated data packet indicates at least the service chain; forwarding the encapsulated data packet in accordance with the service chain, receiving the encapsulated data packet at the end of the service chain, terminating the service chain, removing the encapsulation, and forwarding the data packet to a target destination per the indication of a VPN forwarding context.

Detailed Description

An advantage of L3VPN may be the any-to-any nature of connectivity between devices participating in different sites. Unfortunately, the indirect routing of a hub and spoke topology may effectively negate such an advantage. It will therefore be appreciated by one of ordinary skill in the art that maintaining a VPN context while providing services by forcing a hub and spoke topology with VRFs/VLANs at the hub may be problematic. Furthermore, a given network may configured to provide both forwarding and services for thousands of VPNs; VLAN stitching may be required on a per VPN basis, thereby rendering such a solution both complex and cost/ineffective.

It will be appreciated that the complexity of such a configuration may be, at least in part, a function of the typically conflicting needs of the forwarding plane (i.e., the architecture for forwarding traffic from one point to another) and the services plane (i.e., the architecture for providing services to such traffic as it is forwarded). However, the use of Network Service Header (NSH) service chains may provide a more dynamic service insertion architecture without the complexity of a hub and spoke topology, thereby facilitating the decoupling of forwarding from services.

Figure 1:
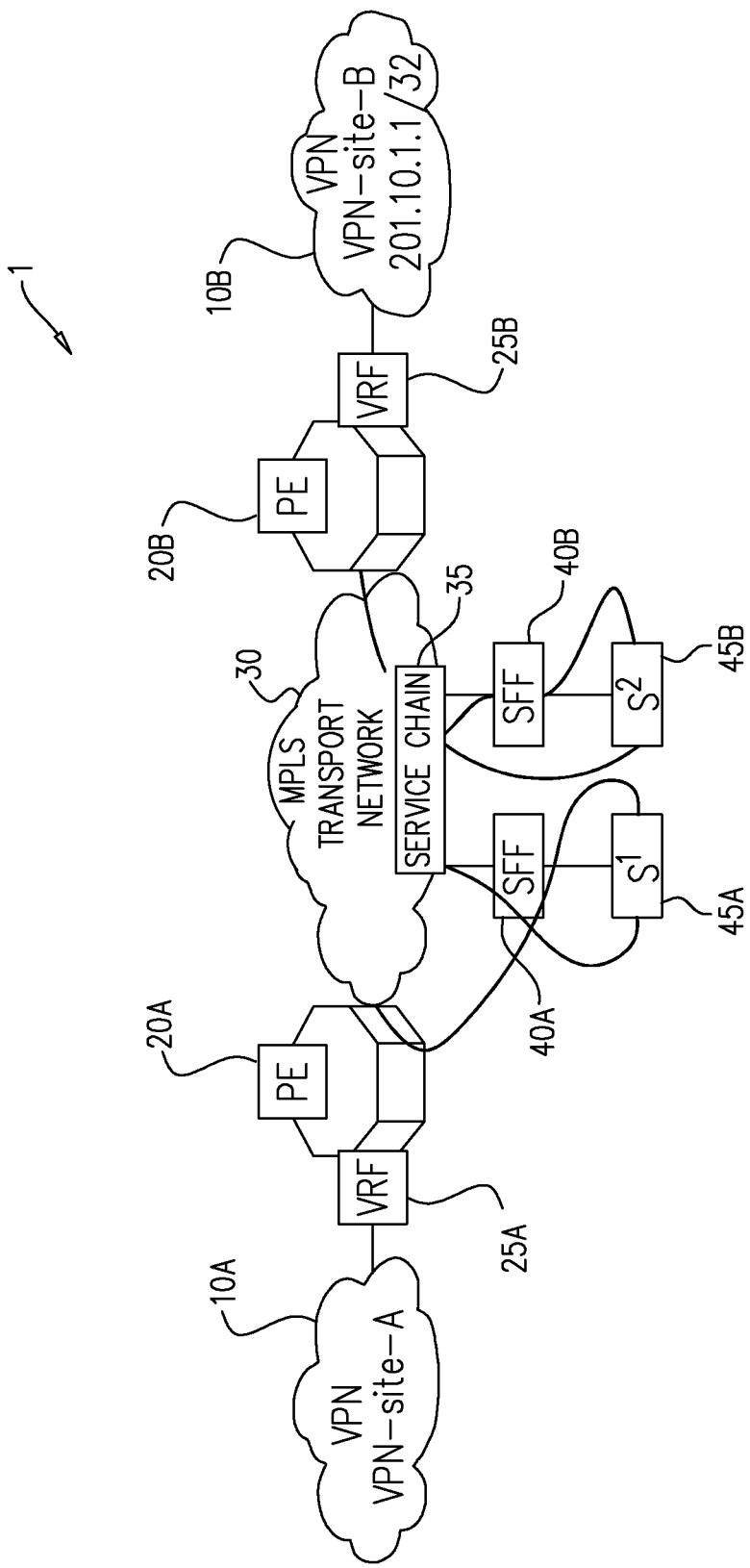
FIG. 1 illustrates an exemplary L3VPN with an NSH service plane, constructed and operative in accordance with embodiments described herein.

Reference is now made to FIG. 1 which illustrates an exemplary L3VPN 1, constructed and operative in accordance with embodiments described herein. L3VPN 1 comprises VPN sites 10A and 10B, provider edge routers (PE) 20A and 20B, VRFs 25A and 25B, and multiprotocol label switched (MPLS) network 30. VPN sites 10A and 10B are two non-directly connected sites, which have at least one device each that belongs to a common VPN. PE 20A and 20B are operated by a network service provider and are configured to provide connectivity between at least VPN sites 10A and 10B via MPLS network 30 which is also operated by the network service provider. It will be appreciated by one of ordinary skill in the art that in the interest of clarity a minimum number of VPN sites 10 and provider edge router 20 are depicted in FIG. 1. It will similarly be appreciated that VPN sites 10 may be associated with multiple VPNs, and that MPLS network 30 may be configured to support communication between multiple VPNs.

In accordance with an exemplary embodiment, traffic, i.e., data packets, originating from VPN site 10A may be forwarded within the same VPN via MPLS network 30 to VPN site 10B. MPLS network 30 may employ an MPLS label stack to preserve the VPN context while the traffic is forwarded to VPN site 10B. For example, L3VPN 1 may support a forwarding topology of:

VPN site 10A-(VRF 25A)PE 20A- - -MPLS 30- - -PE 20B(VRF 25B)—VPN site 10B - 201.10.1.1/32 (VPN-label 201)

PE 20A may use VRF 25A to lookup routing for the address 201.10.1.1/32. Based on the result of the lookup, PE 20A may push an MPLS label stack {VPN-label-201, PE 20B-transport-label} onto traffic (i.e., one or more data packets) to be forwarded to address 201.10.1.1/32 that is reachable through VPN site 10B. The transport label (i.e., PE 20B) is used to forward the traffic from PE 20A to PE 20B, and the VPN-label (i.e., "201") provides PE 20B the "context" in which to forward the traffic, in this case to 201.10.1.1/32. It should be noted that PE 20A may use a per-prefix label for the target VPN (i.e., "201"), or alternatively a per-VRF label (i.e., VRF 25B) thereby forcing a lookup of the destination within the labeled VRF. In such a case, PE 20B may then lookup the routing for 201.10.1.1/32 in VRF 25B.

In accordance with embodiments described herein, an NSH service chain (i.e., set of services) may be inserted between PE 20A and PE 20B so that traffic between VPN site 10A and VPN site 10B flows through the set of services $S^1, S^2 \ldots S''$ within the chain. As shown in FIG. 1, service 45A ($S^1$) may be coupled to service chain 35 via service function forward (SFF) 40A and service 45B ($S^2$) may be coupled to service chain 35 via SFF 40B. Accordingly, per the example of FIG. 1, service chain 35 may be defined as {Service 45A, Service 45B, PE 20B}, where PE 20B is the termination point of the service chain. With the addition of NSH service chain 35, the previously described forwarding topology may be represented as:

VPN site 10A-(VRF 25A)PE 20A- - -S1 45A- - -S2 45B- - -PE 20B(VRF 25B)—VPN site 10B-201.10.1.1/32 (VPN-label 201)

To implement this forwarding topology, PE 20A may classify the traffic to essentially bypass the normal forwarding process (i.e., bypass the L3VPN routing decision) by encapsulating the traffic as NSH packets rather than adding an MPLS label stack as previously described. The NSH header may then be used to steer the traffic through service chain 35 {i.e., Service 45A, Service 45B, PE 20B}. However, it will be appreciated by one of ordinary skill in the art, that without the VPN-label-201 MPLS label as described hereinabove, by the time the traffic reaches the end of service chain 35, i.e., PE 20B, however, the forwarding context may be lost and PE 20B may have no indication what context (i.e., VPN/VRF) to use other than the destination of the packet 102.10.1.1/32.

Figure 2:
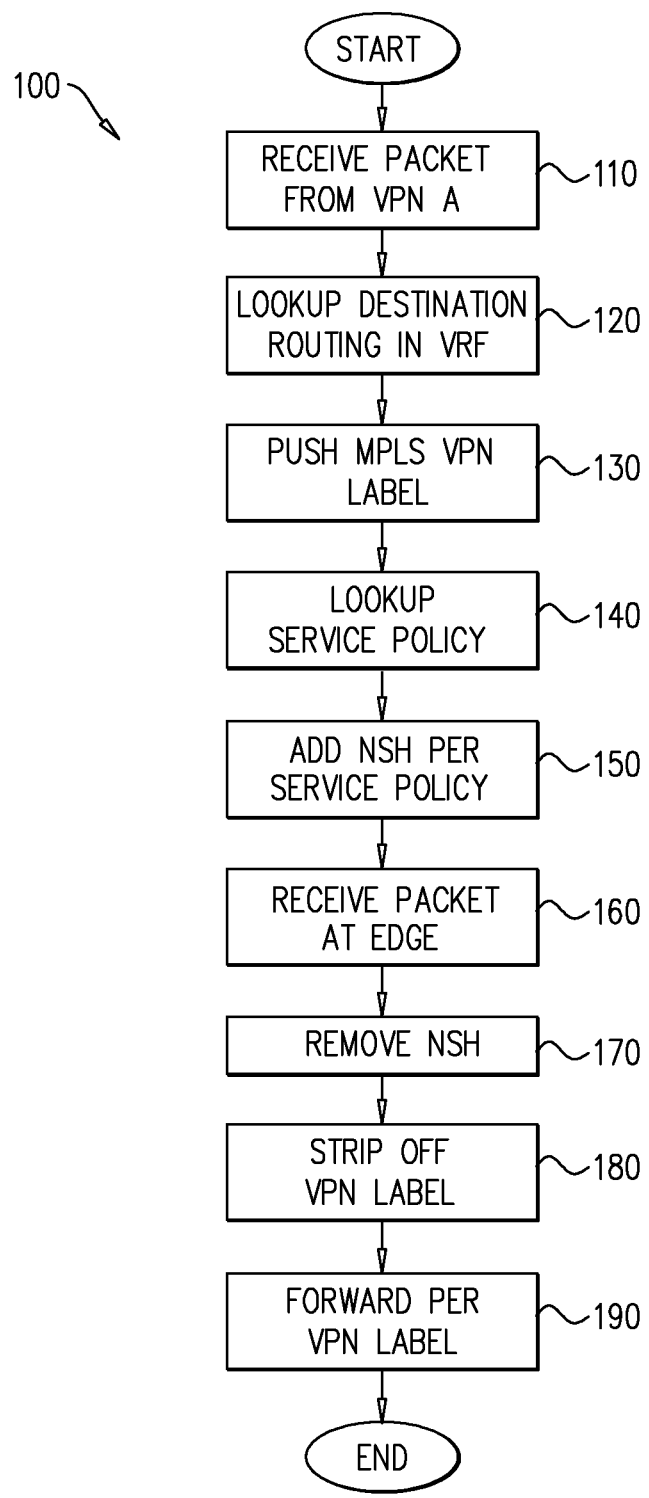
FIGS. 2 and 3 are flowcharts of processes performed within the L3VPN of FIG. 1.

In accordance with embodiments described herein, the forwarding context may be maintained after directing L3VPN traffic through service chain 35 between PE 20A and 20B by configuring NSH to indicate that an MPLS label stack follows the NSH encapsulation, where the label stack contains the VPN-label allocated for the destination of the traffic by PE 20B so that it can continue to forward the traffic within the correct forwarding context. Reference is now also made to FIG. 2 which is a flowchart of a NSH-based service process 100, constructed and operative in accordance with embodiments described herein.

PE 20A receives (step 110) traffic sent to VPN site B by VPN site 10A. PE 20A may lookup (step 120) the destination routing in VRF 25A per the received address (e.g., 201.10.1.1/32), and push (step 130) an MPLS VPN label onto the data packets of the forwarded traffic per the destination routing For example, as per the exemplary embodiment of FIG. 1, the VPN label may be "201".

PE 20A may also use VRF 25A to lookup (step 140) the service policy associated with traffic forwarded with VPN label "201". The service policy may indicate what services are to be applied to traffic associated with VPN label "201"when it is sent between PE 20A and PE 20B. For example, as per the exemplary embodiment of FIG. 1, the service to be applied may be those included in service chain 35, i.e., services 45A and 45B.

PE 20A may add (step 150) the indicated service chain via NSH encapsulation. It will be appreciated by those of ordinary skill in the art that NSH encapsulation may also include a service index to be progressively decremented as the traffic moves from service to service per the indicated service chain, and a next process to be performed at the end of the service chain. Per the exemplary embodiment of FIG. 1, the NSH encapsulation may include at least an indication of service chain 35, a service index calculated to indicate that PE 20B is the last stop in service chain 35 (i.e., for service chain 35 with only two services 45, the service index may be initialized at "255", such that when the traffic reaches PE 20B, the service index may have been decremented to "253" which may be programmatically defined to indicate "end of service" and removal of NSH, thereby indicating the end of service chain 35), and a next process indication of MPLS.

Services 45A and 45B may be applied to the traffic per the policy of service chain 35. Accordingly, per the exemplary embodiment of FIG. 1, the traffic may first be forwarded to SFF 40A, and be forwarded based on the NSH information to apply service 35A to the traffic and to decrement the service index post-service. Per service chain 35 the traffic may then be forwarded to SFF 40B and be forwarded based on the NSH information to apply service 35A to the traffic and to decrement the service index post-service. Services 45 may be applied progressively in such manner until the traffic is forwarded to PE 20B at the end of service chain 35.

Accordingly, when the traffic is received (step 160) by PE 20B, the service index may have been decremented to indicate "end of chain". PE 20B may remove (step 170) the NSH encapsulation, "revealing" the VPN label to be processed by MPLS. PE 20B may then strip off (step 180) the VPN label before forwarding (step 190) the traffic (i.e., to 201.10.1.1/32 per the example) in accordance with the forwarding context indicated by the now stripped off VPN label.

As described hereinabove, in process 100, the forwarding context may be preserved by pushing an MPLS VPN label onto the data packet and indicating a next process of MPLS in the NSH encapsulation. It will be appreciated by one of ordinary skill in the art that NSH may support the provision of metadata that is accessible by services 45A and 45B in service chain 35. In accordance with embodiments described herein, this NSH metadata may be leveraged to preserve the forwarding context without using MPLS labels.

Figure 3:
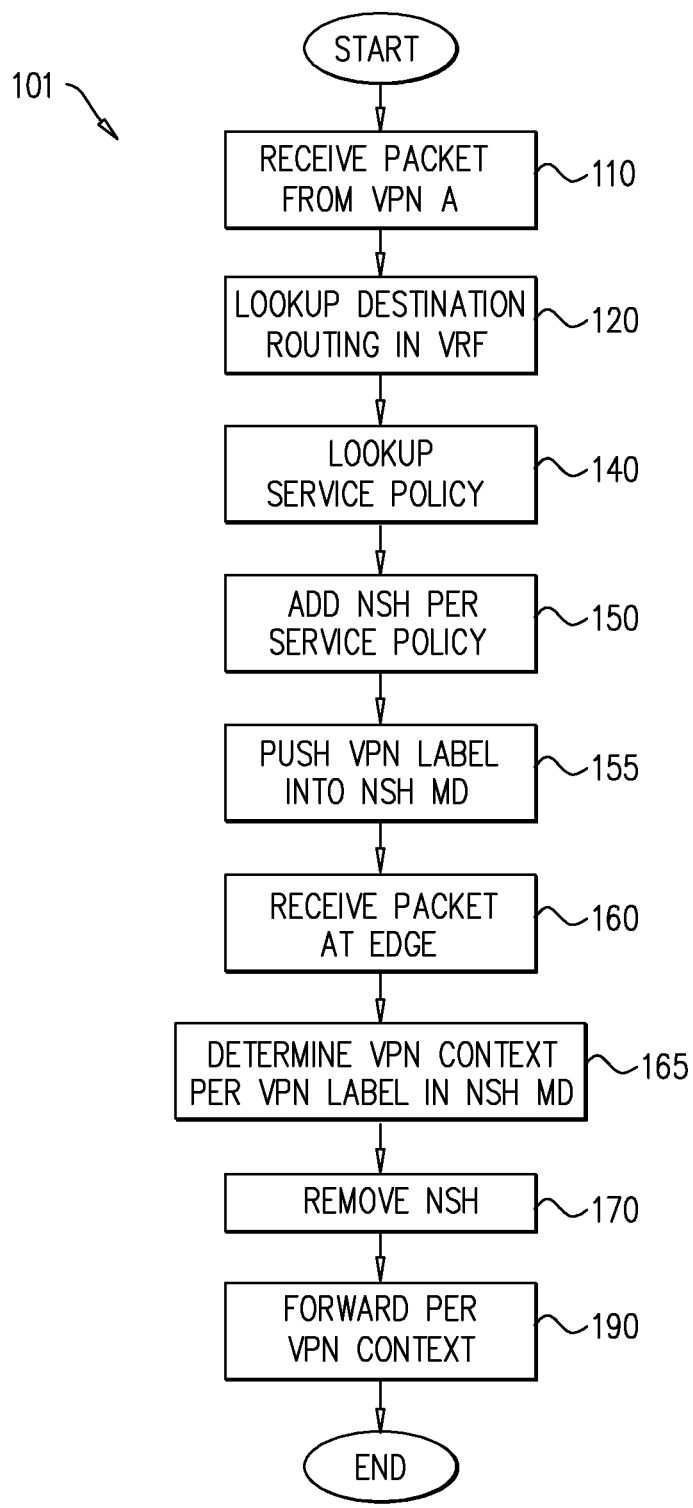

Reference is now also made to FIG. 3 which is a flowchart of a NSH-based service process 101, constructed and operative in accordance with embodiments described herein. Similar reference numerals may refer to similar steps in process 100. Accordingly, PE 20A receives (step 110) traffic sent to VPN site 10B by VPN site 10A. PE 20A may lookup (step 120) the destination routing in VRF 25A per the received address (e.g., 201.10.1.1/32), lookup (step 140) the service policy associated with the destination routing, and add (step 150) the indicated service chain via NSH encapsulation.

However, instead of pushing an MPLS VPN label onto the traffic as in step 130 of process 100, PE 20A may push (step 155) a similar VPN label into the NSH metadata. When the packet is received (step 160) by PE 20B, PE 20B may determine (step 165) a VPN context per the VPN label in the NSH metadata. PE 20B may then remove (step 170) the NSH encapsulation as in process 100. However, there is no need to strip off the VPN label (as per step 180 of process 100) since no MPLS VPN label was pushed onto the packet in an upstream process (as in step 130 of process 100). PE 20B may then forward the received packet within VPN site 10B as per the VPN context determined from the NSH metadata in step 165.

It will be appreciated that according to the approach of the embodiment of FIG. 1, the egress PE, i.e. PE 20B, is part of service chain 35. For example, service chain 35 may be terminated in accordance with the Multiprotocol-Border Gateway Protocol (MP-BGP) Next-Hop PE. However, according to this approach, it may be necessary to define a different service chain 35 for each individual PE-to-PE connection to be supported. In accordance with embodiments described herein, a new service, the virtual-Penultimate-PE-Service (vPenPE service), may be created. When encapsulating the L3VPN packet in NSH (Step 150 in processes 100 and 101), the MP-BGP Next-Hop PE's address may be included as part of the metadata, similar to the inclusion of the VPN label in step 155 of process 101. By including the next hop PE in the metadata, service chain 35 may terminate in the vPenPE Service instead of terminating in accordance with the MP-BGP Next-Hop PE's address. Accordingly, when packets terminate service chain 35 and arrive into this service, the Next-Hop PE may be gathered from the metadata, and a BGP lookup may determine what MPLS label (e.g., VPN) to impose to be sent to the egress PE. In such manner, a given service chain 35 may be used for by more than one PE-PE connection.

Figure 4:
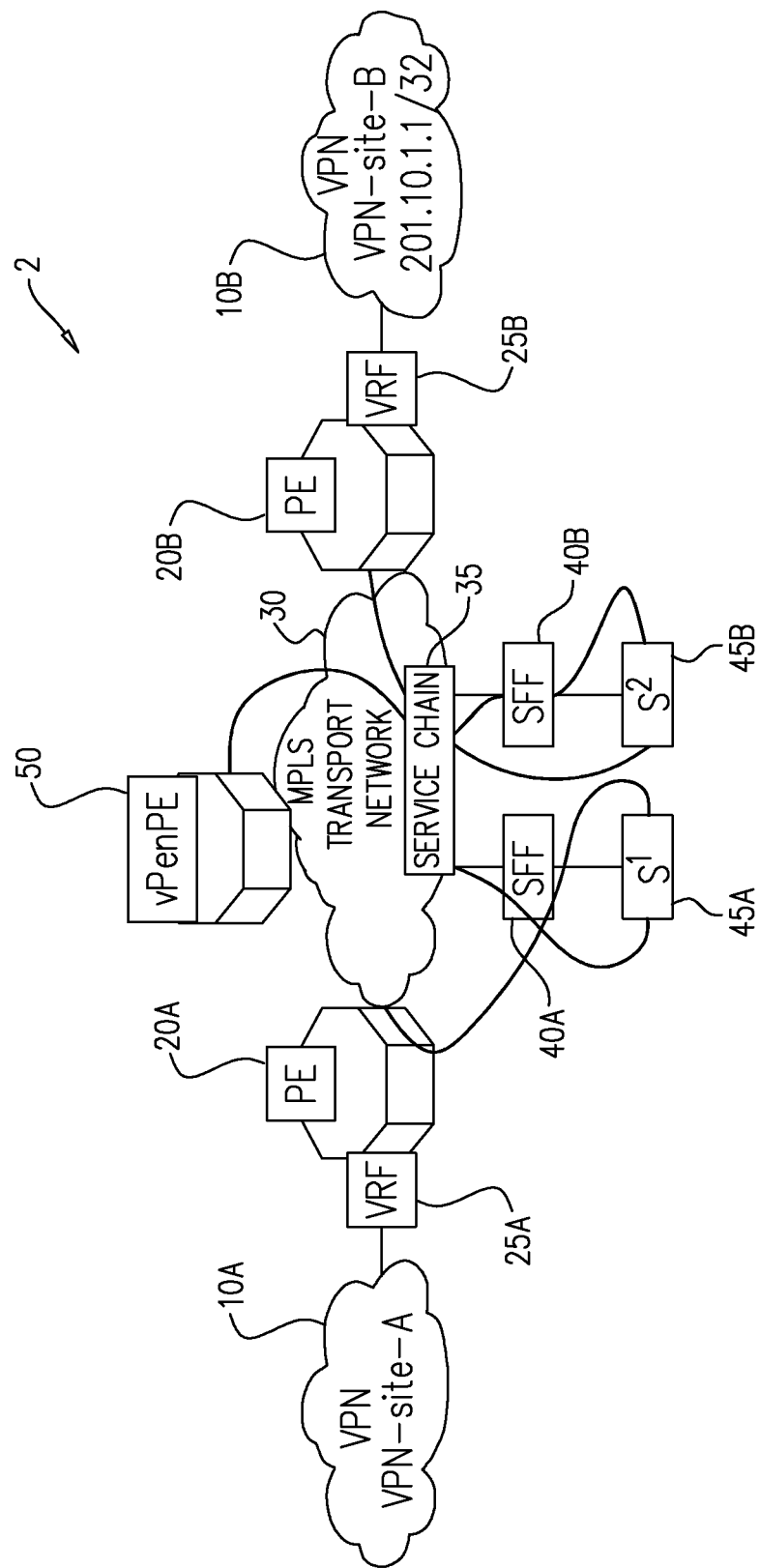
FIG. 4 illustrates an additional exemplary L3VPN, constructed and operative in accordance with embodiments described herein.

Reference is now made to FIG. 4 which illustrates an exemplary L3VPN 2, constructed and operative in accordance with embodiments described herein. Similar to L3VPN 1, L3VPN 2 comprises VPN sites 10A and 10B, provider edge routers (PE) 20A and 20B, multiprotocol label switched (MPLS) network 30, service chain 35, SFFs 40A and 40B, and services 45A and 45B. However, L3VPN 2 also comprises virtual penultimate PE (vPenPE) 50. In the exemplary embodiment of FIG. 4, vPenPE 50 is configured to provide the vPenPE service (either directly or by accessing vPenPE 50 on a different device) to terminate service chain 35 as described hereinabove.

Figure 5:
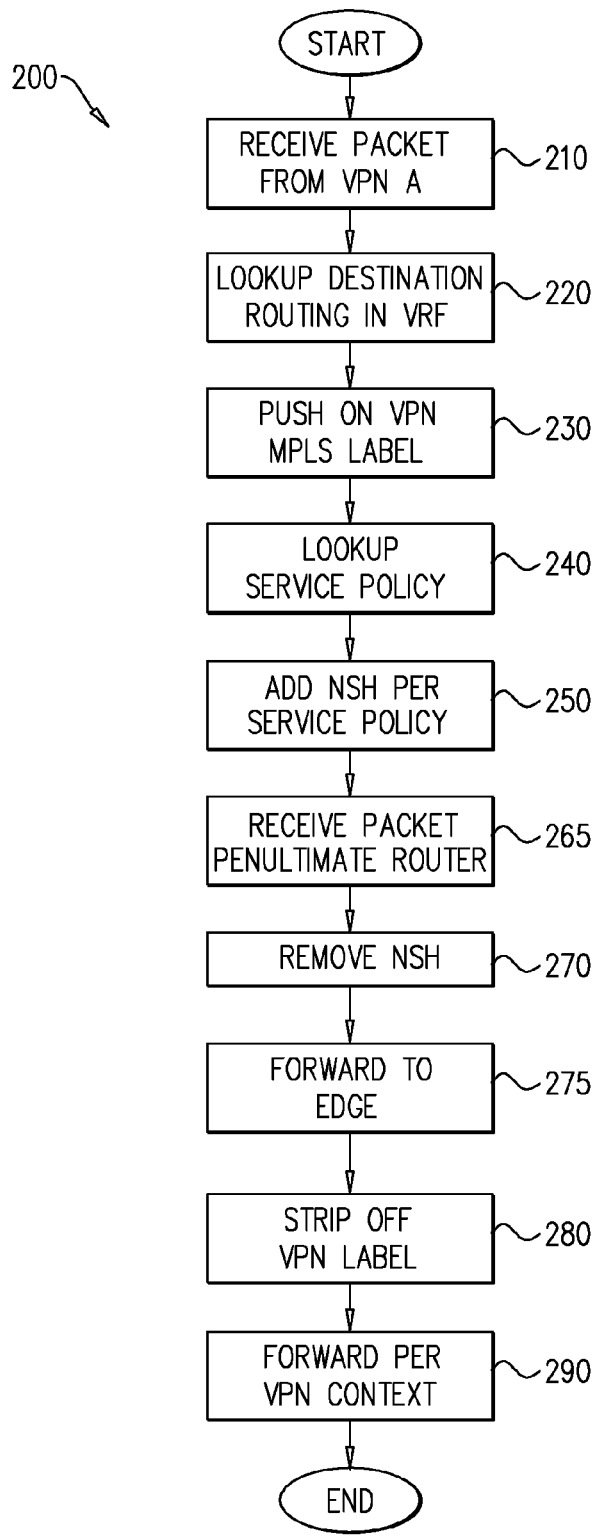
FIGS. 5 and 6 are flowcharts of processes performed within the L3VPN of FIG. 4.

Reference is now made also to FIG. 5 which is a flowchart of a NSH-based service process 200, constructed and operative in accordance with embodiments described herein. Process 200 may begin in a generally similar manner as process 100. PE 20A receives (step 210) traffic sent to VPN site B by VPN site 10A. PE 20A may lookup (step 220) the destination routing in VRF 25A per the received address (e.g., 201.10.1.1/32), push on a VPN MPLS label (step 230), lookup (step 240) the service policy associated with the destination routing, and add (step 250) the indicated service chain 35 via NSH encapsulation. As described hereinabove, in accordance with the embodiment of FIG. 4, service chain 35 may terminate with the vPenPE service. In order to maintain forwarding context after the termination of service chain 35, PE 20A may insert a "next hop" entry of "PE 20B" into the NSH metadata.

When service chain 35 terminates, instead of receiving the packet at PE 20B (as per step 160 in process 100), vPenPE 50 may receive (step 265) the packet. The vPenPE service may then remove (step 270) the NSH encapsulation as in step 170 of process 100. vPenPE 50 may then forward (step 275) the traffic to a PE in accordance with the "next hop" entry in the NSH metadata (i.e., to PE 20B as per the exemplary embodiment of FIG. 4). PE 20B may then strip off (step 280) the VPN label and forward (step 290) the traffic (i.e., to 201.10.1.1/32 per the example) in accordance with the forwarding context indicated by the now stripped off VPN label.

As described hereinabove, in process 200, the forwarding context may be preserved by pushing an MPLS VPN label onto the data packet and indicating a next process of MPLS in the NSH encapsulation. It will be appreciated that as described hereinabove, the NHS metadata may be leveraged to preserve the forwarding context without using MPLS labels.

Figure 6:
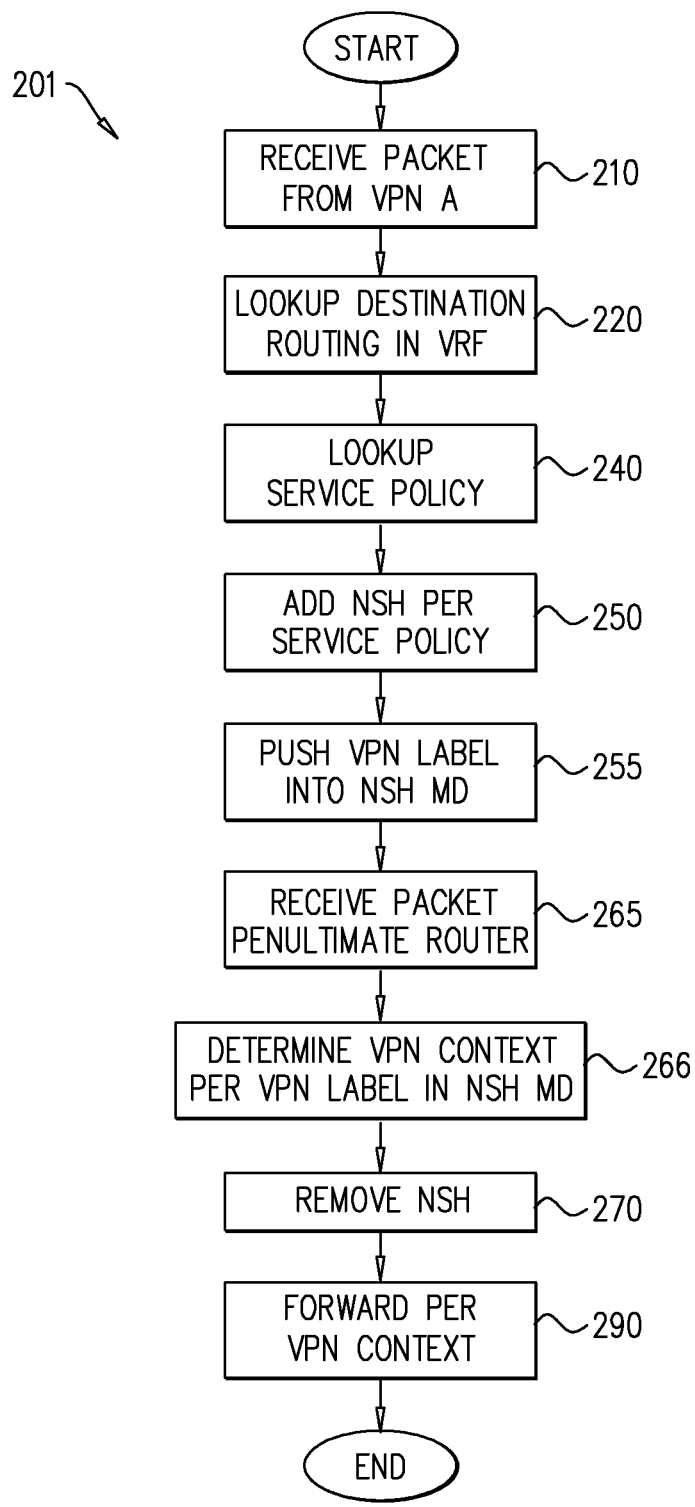

Reference is now also made to FIG. 6 which is a flowchart of a NSH-based service process 201, constructed and operative in accordance with embodiments described herein. Similar reference numerals may refer to similar steps in process 200. Accordingly, PE 20A receives (step 210) traffic sent to VPN site B by VPN site 10A. PE 20A may lookup (step 220) the destination routing in VRF 25A per the received address (e.g., 201.10.1.1/32), lookup (step 240) the service policy associated with the destination routing, and add (step 250) the indicated service chain 35 via NSH encapsulation, including inserting a next hop entry in the NSH metadata.

However, instead of pushing an MPLS VPN label onto the traffic as in step 230 of process 200, PE 20A may push (step 255) a similar VPN label into the NSH metadata. When the packet is received (step 265) by vPenPE 50, the vPenPE service may determine (step 266) a VPN context per the VPN label in the metadata. vPenPE 50 may then remove (step 270) the NSH encapsulation as in process 200. However, there is no need to strip off the VPN label (as per step 280 of process 200) since no MPLS label was pushed onto the packet in an upstream process. vPenPE 50 may then forward the received packet within VPN site 10B via PE 20B (per the next hop entry in the NHS metadata) as per the VPN context determined from the metadata in step 266.

It will therefore be appreciated that the embodiments described herein may provide full integration of NSH service chaining with L3VPNs. Further, routing and services may be decoupled so that services are not tied to topology and routing does not need to be bent following a services topology. Moreover, routing does not need to incorporate a particular topology (such as hub and spoke and/or inline service insertion) to be able to forward site-to-site VPN traffic through a set of services. Also, the dependency on orchestration to maintain L3VPN forwarding context may be removed. As a result of disassociating routing from service insertion and removing dependency on orchestration for VPN context, L3VPN providers may provide services to L3VPN customers with agility, simplicity, and minimized operational costs.

The methods and system described herein allow for creating a service topology "inside" the L3VPN topology (both edge-to-edge). Within that service topology, services can be applied by way of an service chain (either NSH-based, or otherwise), and other features (i.e., other transformations and value-add functions applied on L3VPNs, such as known in the art, in addition to a service chain). Furthermore, these methods are not limited to service chaining. Packets could enter an MPLS network with a VPN ID, go into a Virtual Extensible Local Area Network (VxLAN), go back into the MPLS network, and as along as the proper context header is present, the VPN ID would remain unchanged and consistent without any re-classification.

Further still, these techniques need not be limited to L3VPN. It will be appreciated by one of ordinary skill in the art that any forwarding context such as L2, VxLAN virtual network identifier (VNID), etc. can follow the same pattern. For example, perhaps traffic comes in L2VPN, but it needs to exit the topology with VxLAN. Exit VxLAN information is pushed, then NSH. After the NSH topology, the correct VxLAN is present.

It is appreciated that software components of the present invention may, if desired, be implemented in ROM (read only memory) form. For example, in some embodiments, the operations to be performed at an edge device (e.g., PE 20A, PE 20B and/or vPenPE 50) may be in the form of software that is processed by a processor. The software components may, generally, be implemented in hardware, if desired, using conventional techniques. For example, in some other embodiments, the operations to be performed at an edge device (e.g., PE 20A, PE 20B and/or vPenPE 50) may be in the form of firmware that is processed by Application Specific Integrated Circuits (ASICs), which may be integrated into a circuit board. Alternatively, the operations may be implemented in the form of one or more logic blocks included in a programmable logic device (e.g., a field-programmable gate array).It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof.

What is claimed is:

1. A method for applying network services to data traffic forwarded between virtual private network (VPN) sites, the method comprising:
   on a forwarding edge router in communication with an origin site associated with a VPN, receiving a data packet addressed to a target site associated with said VPN;
   determining a set of services to be applied to said data packet according to a service chain, wherein said determining is a function of at least one of said VPN, said origin site and said target site;
   adding an indication of a VPN forwarding context onto said data packet;
   encapsulating said data packet with Network Service Header (NSH) encapsulation, wherein a header for said encapsulated data packet indicates at least said service chain;
   forwarding said encapsulated data packet in accordance with said service chain;
   on an end of service router, receiving said encapsulated data packet at the end of said service chain, wherein said end of service router terminates said service chain;
   removing said encapsulation; and
   forwarding said data packet to a target destination in accordance with said indication of a VPN forwarding context.

2. The method according to claim 1 and wherein said indication of a VPN forwarding context is a multiprotocol label switched (MPLS) label.

3. The method according to claim 1 and wherein said adding an indication comprises: inserting said indication into NSH metadata.

4. The method according to claim 1 and wherein said end of service router is a receiving edge router in communication with said target site.

5. The method according to claim 1 and wherein said end of service router is a virtual penultimate edge router, wherein said virtual penultimate edge router is positioned between said origin site and said target site.

6. The method according to claim 5 and also comprising: inserting a next hop indication into NSH metadata said virtual penultimate edge router, wherein said next hop indication refers to a receiving edge router in communication with said target site.

7. The method according to claim 6 and wherein said forwarding said data packet comprises:
   forwarding said data packet to said receiving edge router.

8. The method according to claim 5 and wherein said service chain is used to apply said set of services to said data traffic addressed to more than one said target site.

9. The method according to claim 1 and wherein said VPN sites are Level 3 VPN (L3VPN) sites.

10. The method according to claim 1 and wherein said determining comprises:
    looking up said set of service to be applied in Virtual Routing and Forwarding (VRF) table according to at least one said VPN, said origin site or said target site.

11. A router comprising:
    at least one of a processor, application specific integrated circuit (ASIC), or a programmable logic device; and
    executable instructions instantiated in at least one of a memory, firmware, or hardware, wherein said at least one of a processor, application specific integrated circuit (ASIC), or a programmable logic device is configured to execute said executable instructions to:
    receive a data packet addressed a target site associated with a VPN;
    determine a set of service to be applied to said data packet according to service chain, wherein said determining is as a function of at least one of said VPN, an origin site and said target site;
    add an indication of a VPN forwarding context onto said data packet;
    encapsulate said data packet with Network Service Header (NSH) encapsulation, wherein a header for encapsulated data packet comprises an indication of at least said service chain; and
    forward said encapsulated data packet in accordance with said service chain.

12. The router according to claim 11 and wherein said router is a provider edge router.

13. The router according to claim 11 and wherein said at least one of a processor, application specific integrated circuit (ASIC), or a programmable logic device is also configured to execute said executable instructions to:
    receive said encapsulated data packet at an end of said service chain, wherein said router terminates said service chain;
    remove said encapsulation; and
    forward said data packet in accordance with said indication of a VPN forwarding context.

14. The router according to claim 11 and wherein said router is configured to define a virtual penultimate edge router as an end for said service chain, wherein said virtual penultimate edge router is positioned between said origin site and said target site.

15. The router according to claim 11 and wherein said router is also configured to attach an MPLS label to said data packet.

16. The router according to claim 11 and wherein said VPN is a Level 3 VPN.

17. A system for applying network service to data traffic forwarded between virtual private network (VPN) sites, the system comprising:
    means for receiving a data packet addressed to a target site associated with said VPN on a forwarding edge router in communication with an origin site associated with a VPN;

means for determining a set of services to be applied to said data packet according to a service chain, wherein said determining is as a function of at least one of said VPN, said origin site and target site;

means for adding an indication of a VPN forwarding context onto said data packet;

means for encapsulating said data packet with Network Service Header (NSH) encapsulation, wherein a header for said encapsulated data packet indicates at least said service chain;

means for forwarding said encapsulated data packet in accordance with said service chain;

means for receiving said encapsulated data at the end of said service chain on an end of service router, wherein said end of service router terminates said service chain;

means for removing said encapsulation; and means forwarding said data packet to a target destination in accordance with said indication of a VPN forwarding context.

18. The system according to claim 17 and wherein said end of service router is a receiving edge router in communication with said target site.

19. The system according to claim 17 and wherein said end of service router is a virtual penultimate edge router, wherein said virtual penultimate edge router is positioned between said origin site and said target site.

20. The system according to claim 19 and also comprising means for inserting a next hop indication into NSH metadata at said virtual penultimate edge router, wherein said next hop indication refers to a receiving edge router in communication with said target site.

* * * * *

UNITED STATES PATENT AND TRADEMARK OFFICE
CERTIFICATE OF CORRECTION

PATENT NO. : 10,142,128 B2  
APPLICATION NO. : 15/784218  
DATED : November 27, 2018  
INVENTOR(S) : James N. Guichard et al.

Page 1 of 1

It is certified that error appears in the above-identified patent and that said Letters Patent is hereby corrected as shown below:

In the Claims

Claim 6, Column 7, Line 66, please replace "metadata said" with --metadata at said--

Claim 10, Column 8, Line 13, please replace "service" with --services--

Claim 11, Column 8, Line 24, please replace "addressed a target" with --addressed to a target--
Claim 11, Column 8, Line 26, please replace "service" with --services--
Claim 11, Column 8, Line 27, please replace "according to service chain," with --according to a service chain,--
Claim 11, Column 8, Line 34, please replace "encapsulated" with --said encapsulated--

Claim 17, Column 8, Line 60, please replace "service" with --services--
Claim 17, Column 9, Line 4, please replace "and target site" with --and said target site--
Claim 17, Column 9, Line 17, please replace "means forwarding" with --means for forwarding--

Claim 20, Column 9, Line 27, please replace "comprising" with --comprising:--

Signed and Sealed this
Sixteenth Day of April, 2019

Andrei Iancu
*Director of the United States Patent and Trademark Office*